United States Patent
Sommers

(10) Patent No.: US 8,377,409 B2
(45) Date of Patent: Feb. 19, 2013

(54) METHODS FOR MAKING BRINES

(75) Inventor: James A. Sommers, Albany, OR (US)

(73) Assignee: ATI Properties, Inc., Albany, OR (US)

(*) Notice: Subject to any disclaimer, the term of this patent is extended or adjusted under 35 U.S.C. 154(b) by 270 days.

(21) Appl. No.: 12/559,742

(22) Filed: Sep. 15, 2009

(65) Prior Publication Data

US 2011/0062381 A1 Mar. 17, 2011

(51) Int. Cl.
*C09K 3/00* (2006.01)

(52) U.S. Cl. .......... 423/498; 252/182.32; 423/497; 210/633; 210/642

(58) Field of Classification Search .......... 423/498; 252/182.32
See application file for complete search history.

(56) References Cited

U.S. PATENT DOCUMENTS

| | | | |
|---|---|---|---|
| 3,081,155 A * | 3/1963 | Dinan | 423/639 |
| 4,323,437 A | 4/1982 | Mucenieks | |
| 4,336,232 A * | 6/1982 | Moritz | 423/164 |
| 4,341,752 A | 7/1982 | Groenhof | |
| 4,755,303 A | 7/1988 | Sweat | |
| 5,728,652 A | 3/1998 | Dobson, Jr. et al. | |
| 6,001,316 A | 12/1999 | Langseth et al. | |
| 6,468,481 B1 * | 10/2002 | Anderson | 422/261 |
| 6,776,972 B2 | 8/2004 | Vohra et al. | |
| 2003/0198589 A1 * | 10/2003 | Symens et al. | 423/491 |
| 2004/0082485 A1 | 4/2004 | Walker | |
| 2008/0234148 A1 | 9/2008 | Walker | |

FOREIGN PATENT DOCUMENTS

| | | | |
|---|---|---|---|
| JP | 61-186218 A | | 8/1986 |
| JP | 61186218 A | * | 8/1986 |

OTHER PUBLICATIONS

English translation of Tominaga et al., JP 61186218A, translated by Schreiber Translations, Inc. in Jan. 2012.*

* cited by examiner

*Primary Examiner* — Harold Pyon
*Assistant Examiner* — Katie L Hammer
(74) *Attorney, Agent, or Firm* — K & L Gates LLP; Patrick J. Viccaro; John E. Grosselin, III

(57) ABSTRACT

Methods for making brines may generally comprise forming a mixture comprising: (i) a solid material produced as a by-product of the Kroll process including solid anhydrous magnesium chloride and solid elemental magnesium; (ii) an amount of a previously-produced brine; and (iii) an amount of water sufficient to provide a predetermined brine concentration. At least a portion of the solid material in the mixture is dissolved while simultaneously controlling the temperature of the mixture. At least a portion of insoluble matter is separated from the mixture.

43 Claims, 1 Drawing Sheet

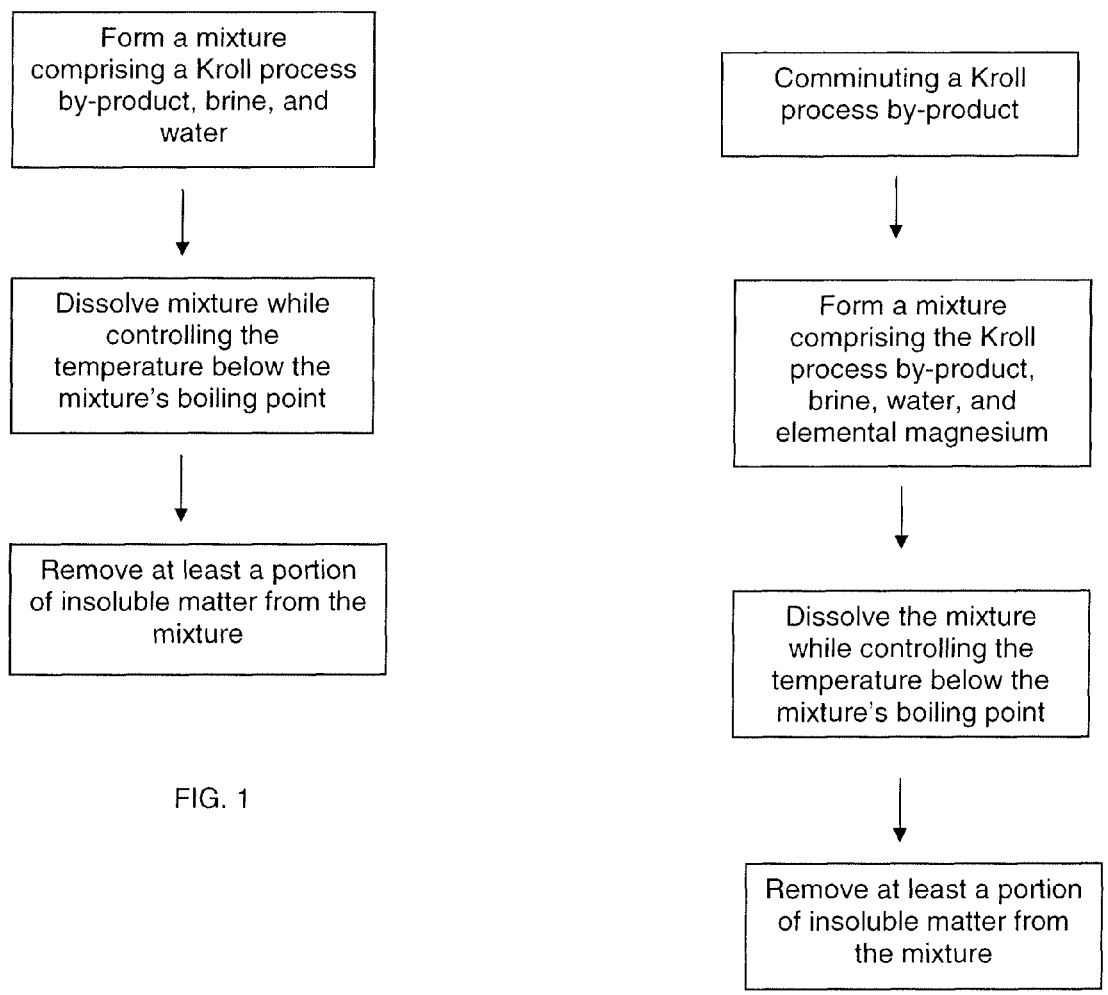

METHODS FOR MAKING BRINES

BACKGROUND OF THE TECHNOLOGY

1. Field of Technology

This application generally relates to methods for making concentrated aqueous solutions including high concentrations of dissolved magnesium chloride. This application also relates to methods for utilizing anhydrous magnesium chloride and other solid by-products of the Kroll process, which is conventionally used to make metallic titanium, zirconium, and hafnium.

2. Description of the Background of the Technology

A brine is a concentrated salt solution, e.g., a concentrated aqueous solution of sodium chloride or magnesium chloride ($MgCl_2$). Magnesium chloride brine may be used as, for example, a de-icer, an anti-icer, or a dust suppressant. Commercial magnesium chloride brines commonly contain about 30 weight percent of magnesium chloride. Magnesium chloride may form various hydrates having the general formula $MgCl_2 \cdot (H_2O)_x$ when dissolved in water. Commercial brines comprising hydrated magnesium salts also may include toxic and/or corrosive impurities. Removing the impurities may be expensive and require complex processing. Therefore, industrial production of magnesium chloride brines including low levels of toxic and/or corrosive impurities is of significant commercial interest.

The Kroll process may be used to make metallic titanium, zirconium, and hafnium from certain ores. Metallic titanium, for example, may be manufactured by purifying titanium dioxide ore, chlorinating the refined ore to form titanium tetrachloride in the presence of magnesium or another reducing agent, and reducing the titanium tetrachloride to metallic titanium in a neutral argon or helium atmosphere. This process may be represented by the following equation:

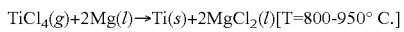

$$TiCl_4(g) + 2Mg(l) \rightarrow Ti(s) + 2MgCl_2(l) \, [T=800\text{-}950°\,C.]$$

The Kroll process produces titanium in the form of a porous metallic titanium sponge and a solid material by-product that includes solid anhydrous magnesium chloride and metal solids, such as titanium and magnesium. The anhydrous magnesium chloride produced as a by-product of the Kroll process may include a reduced concentration of toxic and/or corrosive impurities compared to commercial brines comprising hydrated magnesium salts. Making magnesium chloride brine using conventional techniques from anhydrous magnesium chloride, however, is problematic because such conventional techniques involve special processing equipment and handling techniques. This is because if anhydrous magnesium chloride is contacted with water in the prescribed ratio for 30% brine, the temperature of the mixture increases rapidly to 130° C., the boiling temperature of the brine, and vigorously generates steam. Indeed, the solid material by-product of the Kroll process is characterized as a hazardous waste because of the exothermic dissolution of the anhydrous magnesium salt in water, as well as the pyrophoric hazard of the metal solids and the possible generation of hydrogen gas from the reaction of excess magnesium with water.

Therefore, it would be advantageous to provide more commercially viable and cost-effective methods of making brines from anhydrous magnesium chloride.

SUMMARY

According to one aspect of the present disclosure, certain embodiments of a method for making a brine including dissolved magnesium chloride generally comprise: forming a mixture comprising (i) a solid material produced as a by-product of the Kroll process including solid anhydrous magnesium chloride and solid elemental magnesium, (ii) an amount of a previously-produced brine, and (iii) an amount of water sufficient to provide a predetermined brine concentration; dissolving at least a portion of the solid material in the mixture while simultaneously controlling the temperature of the mixture; and filtering at least a portion of insoluble matter from the mixture. In at least one non-limiting embodiment, the method may further comprise comminuting the solid material included in the mixture to a desired particle size. In at least another non-limiting embodiment, the method may further comprise including additional solid elemental magnesium in the mixture. In yet another non-limiting embodiment, controlling the temperature of the mixture may comprise controlling the temperature of the mixture to a temperature less than the boiling point of the mixture.

According to another aspect of the present disclosure, certain embodiments of a method for making a brine comprising dissolved magnesium chloride generally comprise: comminuting a solid material produced as a by-product of the Kroll process including solid anhydrous magnesium chloride to particles including a largest dimension less than 10 mm; forming a mixture comprising (i) an amount of the comminuted solid material, (ii) at least 0.05% solid elemental magnesium (wherein the weight percentage is based on the weight of anhydrous magnesium chloride in the solid material), (iii) 2 parts by volume of a previously-produced brine comprising magnesium chloride (wherein the volume is based on the volume of the brine produced by the method), and (iv) an amount of water sufficient to provide a predetermined brine concentration; dissolving at least a portion of the solid material in the mixture while simultaneously controlling the temperature of the mixture; and filtering at least a portion of insoluble matter from the mixture. In at least one embodiment, the method may further comprise agitating the mixture. Also, in at least one embodiment, controlling the temperature of the mixture may comprise controlling the temperature of the mixture to a temperature less than the boiling point of the mixture.

BRIEF DESCRIPTION OF THE DRAWINGS

The various embodiments described herein may be better understood by considering the following description in conjunction with one or more of the accompanying drawings:

FIG. 1 is a flowchart illustrating one non-limiting embodiment of a method of making a brine according to the present disclosure; and FIG. 2 is a flowchart illustrating another non-limiting embodiment of a method of making a brine according to the present disclosure.

DESCRIPTION OF CERTAIN NON-LIMITING EMBODIMENTS

The present disclosure describes features, aspects, and advantages of various novel embodiments of methods for making brines including dissolved magnesium chloride. It is understood, however, that this disclosure also embraces numerous alternative embodiments that may be accomplished by combining any of the various features, aspects, and advantages of the various embodiments described herein in any combination or sub-combination that one of ordinary skill in the art may find useful.

All numerical quantities stated herein are approximate unless stated otherwise; meaning that the term "about" may be inferred when not expressly stated. The numerical quantities disclosed herein are to be understood as not being strictly limited to the exact numerical values recited. Instead, unless stated otherwise, each numerical value included in the present description is intended to mean both the recited value and a functionally equivalent range surrounding that value. Notwithstanding the approximations of numerical quantities stated herein, the numerical quantities described in specific examples of actual measured values are reported as precisely as possible.

All numerical ranges stated herein include all sub-ranges subsumed therein. For example, a range of "1 to 10" is intended to include all sub-ranges between and including the recited minimum value of 1 and the recited maximum value of 10. Any maximum numerical limitation recited herein is intended to include all lower numerical limitations. Any minimum numerical limitation recited herein is intended to include all higher numerical limitations.

In the following description, certain details are set forth in order to provide a better understanding of various embodiments. However, one skilled in the art will understand that these embodiments may be practiced without these details. In other instances, well-known structures, methods, and/or techniques associated with methods of practicing the various embodiments may not be shown or described in detail to avoid unnecessarily obscuring descriptions of other details of the various embodiments.

A. DEFINITIONS

As generally used herein, the term "comprising" refers to various steps and/or components conjointly employed in practicing the methods described herein. Accordingly, the terms "consisting essentially of" and "consisting of" are embodied in the term "comprising".

As generally used herein, the articles "the", "a", and "an" refer to one or more of what is claimed or described.

As generally used herein, the terms "include", "includes", and "including" are meant to be non-limiting.

As generally used herein, the terms "have", "has", and "having" are meant to be non-limiting.

As generally used herein, the phrase "mostly free" means that the material being discussed is present in a composition, if at all, in a concentration less than 50% by weight of the composition.

As generally used herein, the phrase "substantially free" means that the material being discussed is absent or is present only as an incidental impurity in the composition being discussed. In other words, the concentration of the material in the composition is insignificant in that it does not affect the properties of the composition.

As generally used herein, the phrase "completely free" means that the material being discussed is not present in the composition under discussion.

B. OVERVIEW

Certain embodiments of methods according to the present disclosure for making brines comprising dissolved magnesium chloride will be described herein using the solid material by-products from titanium production by the Kroll process. These embodiments are provided for purposes of illustrating the present invention, and should not be considered to limit the present invention. For example, it will be understood that the methods described herein for making brines may be adapted to utilize the anhydrous magnesium chloride-containing by-products of a Kroll process for making any of metallic titanium (Ti), zirconium (Zr), and hafnium (Hf). Also, it is contemplated that the methods for making brines described herein may be adapted to use anhydrous alkaline earth chloride-containing by-products of certain processes similar to the Kroll process. For example, the Hunter process is similar to the Kroll process, but uses sodium instead of magnesium to reduce titanium tetrachloride to titanium metal and produces sodium chloride as a by-product. It is contemplated that the present process may be adapted to produce brines including dissolved sodium chloride from the by-products of the Hunter process. More generally, it is believed that the methods described herein may be adapted for making brines including dissolved magnesium chloride, sodium chloride, calcium chloride, or other alkaline earth chlorides formed as anhydrous by-products when producing metals using alkaline earth reducing agents in the Kroll process and similar processes.

During production of titanium by the Kroll process, at least a portion of the by-products of the reaction, which include anhydrous magnesium chloride and elemental magnesium, may form a layer of molten material that can be separated from the titanium product in the reactor. The liquid by-products may be separated from the titanium by transferring the by-products from the reactor into a cooling receptacle and/or transferring the titanium from the reactor. Once separated, the liquid by-products may be allowed to cool and solidify into a solid material.

The solid material by-product of the Kroll process, which includes solid anhydrous magnesium chloride and solid elemental magnesium, may include a reduced concentration of toxic and/or corrosive impurities compared to existing commercially available brines comprising hydrated magnesium salts. Because the purity of starting materials used in the Kroll process may be carefully controlled, the purity of solid anhydrous magnesium chloride produced as a by-product may exceed the purity of existing commercially available hydrated magnesium salts. In at least one non-limiting embodiment of a method of producing a brine including dissolved magnesium chloride according to the present disclosure, the brine is made using solid anhydrous magnesium chloride produced as a by-product of the Kroll process and including a reduced level of toxic and/or corrosive impurities compared to existing commercially available brines comprising hydrated magnesium salts. In certain non-limiting embodiments of a method according to the present disclosure, the solid anhydrous magnesium chloride produced as a by-product of the Kroll process that is used to produce the brine is mostly free, substantially free, or completely free (as defined above) from toxic and/or corrosive impurities compared to existing commercially available brines comprising hydrated magnesium salts.

Certain embodiments of methods of making brines described herein may have certain advantages over conventional approaches. Such advantages include, but are not limited to: reduced levels of toxic and/or corrosive impurities in the brines compared to existing commercially available brines comprising hydrated magnesium salts; improved control of the pyrophoric hazards posed by the metal solids present and the exothermic dissolution of anhydrous magnesium salt; simplified processing and handling conditions; recycling of reaction components; and/or reduced levels of waste products.

C. METHODS OF MAKING

Referring to FIG. 1, in certain non-limiting embodiments according to the present disclosure, a method for making a brine comprising dissolved magnesium chloride may generally comprise forming a mixture including: (i) a solid material produced as a by-product of the Kroll process; (ii) an amount of a previously-produced brine (also referred to herein as a "heel") including dissolved magnesium chloride; and (iii) an amount of water sufficient to provide a predetermined brine concentration in the final brine product produced by the method. At least a portion of the solid material included in the mixture is dissolved in the water in the mixture. Simultaneous with dissolving at least a portion of the solid material, the temperature of the mixture is controlled so that it does not exceed a particular maximum temperature. After allowing the dissolution of the solid material to proceed for a period of time sufficient to produce a brine having a desired concentration of dissolved magnesium chloride in water, at least a portion of insoluble matter is separated from the mixture using any one or more selected separation techniques. In at least one non-limiting embodiment of the method, the solid material is a by-product of the production of one of titanium, zirconium, and hafnium by the Kroll process.

In certain embodiments of the method of FIG. 1, the solid material produced as a by-product of the Kroll process includes solid anhydrous salts and metal solids. In at least one embodiment, the solid anhydrous salts comprise magnesium chloride ($MgCl_2$) and, possibly, relatively small concentrations of titanium dichloride ($TiCl_2$) and/or titanium trichloride ($TiCl_3$). Titanium dichloride and titanium trichloride may result from the partial reduction of titanium tetrachloride ($TiCl_4$) during production of titanium by the Kroll process. In at least one embodiment, the solid anhydrous salts principally comprise magnesium chloride. In at least one embodiment, the metal solids comprise at least one of solid elemental magnesium, titanium, zirconium, and hafnium.

In certain embodiments, a method according to the present disclosure for making a brine comprising dissolved magnesium chloride may further comprise, prior to forming the mixture, comminuting the solid material to a desired particle size. In at least one embodiment, the method comprises, prior to forming the mixture, comminuting the solid material to particles including a largest dimension less than 10 mm. In at least another embodiment, the method comprises, prior to forming the mixture, comminuting the solid material to particles including a largest dimension less than 5 mm. In yet another embodiment, the method comprises, prior to forming the mixture, comminuting the solid material to particles including a largest dimension from 5 mm to 10 mm. There is no minimum acceptable size of the particles of solid material, although it is not necessary to comminute the solid material to an excessively fine size.

As noted above, the liquid by-products of the Kroll process may be separated from the metal produced in the process and cooled to a solid material. The solid material may solidify in the form of, for example, large or massive solids. Anhydrous magnesium chloride in the solids may form as large, intergrown crystals which deform upon mechanical action. Without intending to be bound to any particular theory, comminuting a solid Kroll process by-product including solid anhydrous magnesium chloride to a desired particle size may improve the rate of dissolution of the solid material in the mixture and/or, during dissolution, facilitate controlling the temperature of the mixture so as not to exceed a particular maximum temperature. For example, if the solid material by-product is too coarse and/or is added too rapidly to the mixture, the solid material by-product may partially recrystallize in the mixture to form a large solid mass that may be very slow to dissolve.

In certain embodiments according to the present disclosure, a method for making a brine comprising dissolved magnesium chloride further comprises including additional solid elemental magnesium in the mixture. The solid elemental magnesium is referred to as "additional" because the solid material by-product of the Kroll process typically includes some amount of elemental magnesium left un-reacted in the process, i.e., "excess" magnesium. In at least one embodiment, the method may further comprise including 0.01 to 0.1 weight percent of additional solid elemental magnesium in the mixture, wherein the weight percentage is based on the weight of anhydrous magnesium chloride in the solid material. According to another embodiment, the method comprises including 0.01 to 0.05 weight percent of additional solid elemental magnesium in the mixture, wherein the weight percentage is based on the weight of anhydrous magnesium chloride in the solid material. According to yet another embodiment, the method comprises including up to 0.05 weight percent of additional solid elemental magnesium in the mixture, wherein the weight percentage is based on the weight of anhydrous magnesium chloride in the solid material.

Elemental magnesium in the mixture may react with the previously-produced brine and/or water to form solid magnesium hydroxide. Magnesium hydroxide has low solubility in water. In at least one embodiment, the solid magnesium hydroxide forms flocculant particles in the mixture, forming on and around smaller particles of metals and other insoluble matter in the mixture and assists in their settling out of the mixture. The generation of the flocculant particles thereby entraps fine metals particles and other solids and allows them to be readily captured as a solid waste material by filtering or other suitable techniques, and without the pyrophoric hazards of the isolated fine metal particles. Given the advantages gained by generation of the flocculant, the method of the present disclosure preferably, although optionally, includes adding additional magnesium to the mixture, which will enhance formation of the flocculant particles.

With regard to embodiments of the method according to the present disclosure, water added to the other components of the mixture may include, for example, one or more of purified water, suitably pure tap water, suitably pure wash water, and previously made, dilute brine. As an example, a previously made brine may have become unacceptably dilute due to leaking of a water pump seal into the brine, and this dilute brine may be "recycled" by being included as at least a portion of the "water" of the mixture when producing a new brine according to the present method. In general, it will be understood that sources of "water" other than purified water can be used in embodiments of methods according to the present disclosure, as long as the water source would not introduce materials into the mixture that will negatively affect the character or properties of the brine produced by the method.

With further reference to FIG. 1, in embodiments of a method of making a brine comprising dissolved magnesium chloride according to the present disclosure, the step of forming a mixture comprises including an amount of a previously-produced brine (heel) in the mixture. In at least one embodiment, the previously-produced brine includes a dissolved magnesium salts such as, for example, dissolved magnesium chloride. In certain embodiments, the previously-produced brine may be or may include a brine formed using solid anhydrous magnesium chloride produced as a by-product of the Kroll process. It will be understood, however, that the previously-produced brine is not limited to a brine formed using a Kroll process by-product, and may be formed in any desired manner that produces a brine having suitable characteristics necessary for use in the present method. The heel must be nominally the same concentration as the brine to be produced by the method and must have a lower temperature than the desired final brine batch temperature.

In certain embodiments, a method for making a brine comprising dissolved magnesium chloride may comprise forming a mixture including a portion of a previously-produced brine, wherein the ratio of the volume of the previously-produced brine included in the mixture to the volume of the brine produced by the method is at least 1:1. In certain embodiments, the ratio of the volume of the previously-produced brine to the volume of the brine produced by the method may be at least 2:1. In at least one embodiment, the ratio of the volume of the previously-produced brine to the volume of the brine produced by the method may be in the range of 1:1 to 2:1 (inclusive of the end points). It is believed that it is advantageous to include an amount of a previously-produced brine in the mixture in the above proportions in order to improve the dissolution rate of the solid material in the mixture and/or to act as a thermal mass that assists in controlling the temperature of the mixture to no more than a maximum temperature during exothermic dissolution of the solid material.

Referring to FIG. 2, in certain non-limiting embodiments according to the present disclosure a method for making a brine comprising dissolved magnesium chloride includes comminuting a solid material produced as a by-product of the Kroll process including solid anhydrous magnesium chloride to particles including a largest dimension less than 10 mm. A mixture is made comprising: (i) an amount of the comminuted solid material; (ii) 0.05 weight percent solid elemental magnesium, wherein the weight percentage is based on the weight of anhydrous magnesium chloride in the comminuted solid material added to the mixture; (iii) 2 parts by volume of a previously-produced brine comprising magnesium chloride, wherein the volume is based on the total volume of the brine produced by the method; and (iv) an amount of water sufficient to provide a predetermined brine concentration. At least a portion of the solid material added to the mixture is allowed to dissolve, while simultaneously controlling the temperature of the mixture. At least a portion of insoluble matter is removed from the mixture once the dissolution of the solid material is allowed to proceed for a desired time.

In certain embodiments, a method for making a brine according to the present disclosure includes agitating the mixture to promote more rapid dissolution of magnesium chloride and/or help control the temperature of the mixture. In at least one embodiment, agitating the mixture comprises sparging the mixture with a gas such as, for example, air, or any other suitably inert gas. In certain other embodiments of the method, the method includes recirculating the mixture to facilitate dissolving of magnesium chloride and/or controlling the temperature of the mixture. In certain other embodiments, both sparging and recirculating are employed to facilitate dissolving of magnesium chloride and/or controlling the temperature of the mixture.

In certain embodiments, a method for making a brine comprising dissolved magnesium chloride may comprise forming the mixture in a single reactor. As used herein, the phrase "formed in a single reactor" means that two or more processes described herein may be performed in one reactor without an intermediate isolation step. In at least one embodiment, forming the mixture in a single reactor may comprise adding to the single reactor the solid material, the previously-produced brine (heel), and water sufficient to provide a predetermined brine concentration. In at least one embodiment, additional solid elemental magnesium is also included in the single reactor. According to certain embodiments, the mixture is agitated and/or recirculated within the single reactor.

In certain embodiments, a method for making a brine comprising dissolved magnesium chloride may comprise forming the mixture in a reactor system. As used herein, the phrase "forming in a reactor system" and the like means that two or more steps of a method described herein may be performed in one or more reactors without an intermediate isolation step. In at least one embodiment, the reactor system may comprise a dissolving tank and a recirculation tank. Also, in at least one embodiment, forming the mixture in a reactor system may comprise adding the solid material to the dissolving tank and adding the previously-produced brine (heel) and water sufficient to provide a predetermined brine concentration to the recirculation tank. In certain embodiments, additional solid elemental magnesium is added to at least one of the dissolving tank and recirculation tank. Also, in certain embodiments, the method according to the present disclosure includes agitating and/or recirculating the mixture in at least one of the dissolving tank and/or the recirculation tank. In certain embodiments, the temperature of the mixture in the dissolving tank is less than 80° C., and the temperature of the mixture in the recirculating tank is less than 60° C., thereby facilitating active heat exchange between the tanks. It is contemplated that providing for active heat exchange between separate tanks in a reactor system would be particularly advantageous when performing the method as a large scale, continuous operation. For example, depending on the desired production rate using the method according to the present disclosure, the heel may cool passively during times of slow production, and to allow for continuous production, some form of heat exchange may be provided to maintain the heel at a temperature conducive to a reasonable rate of dissolution of the magnesium chloride in the mixture.

In certain embodiments, controlling the temperature of the mixture may comprise controlling the temperature of the mixture to a temperature less than the boiling point of the mixture. In one embodiment, controlling the temperature of the mixture comprises controlling the temperature of the mixture to a temperature less than 130° C. In another embodiment, controlling the temperature of the mixture comprises controlling the temperature of the mixture to a temperature less than one of 90° C., 80° C., and 60° C. In yet another embodiment, controlling the temperature of the mixture comprises controlling the temperature of the mixture to a temperature in the range of 50 to 90° C., or more preferably in the range of 60 to 80° C. In at least one embodiment, controlling the temperature of the mixture comprises controlling the temperature of the mixture using a heat exchanger. Excessively high temperatures may prevent the use of certain useful materials of construction, e.g., fiberglass reinforced plastics, while excessively low temperatures may lower the dissolution rate of magnesium chloride to an unacceptably low rate.

In certain embodiments, filtering at least a portion of insoluble matter from the mixture may comprise filtering the mixture using any one or more apparatuses or methods known to ordinarily skilled artisans. In at least one embodiment, filtering at least a portion of insoluble matter from the mixture may comprise filtering the mixture through a particle size filter, such as, for example, a one micron particle filter. Other possible filtration means that may be useful include, for example, cartridge filters, plate-and-frame filters, and sand filters. In at least one embodiment, the insoluble matter may comprise at least one of solid anhydrous salts and metal solids. In certain embodiments, the insoluble matter may comprise at least one of magnesium chloride, titanium trichloride, magnesium, titanium, zirconium, hafnium, magnesium hydroxide, and incidental foreign matter. In at least one embodiment, filtering at least a portion of insoluble matter from the mixture may produce a non-ignitable solid waste including one or more elemental metals.

In certain embodiments, a method for making a brine comprising dissolved magnesium chloride according to the present disclosure may further comprise adjusting the pH of the mixture. Magnesium hydroxide, for example, produced in the mixture may result in a relatively high brine pH and it may be desirable to adjust pH downwardly. In at least one embodiment, adjusting the pH of the mixture may comprise adjusting the mixture to a pH range of 6 to 9. In at least one embodiment, the pH may be adjusted downwardly using an acid, such as hydrochloric acid. In at least one embodiment, adjusting the pH of the mixture to an acidic pH may facilitate dissolving the magnesium hydroxide in the mixture. In at least one embodiment, the method may further comprise dissolving at least a portion of insoluble matter in the mixture. In at least one embodiment, the pH of the mixture may be adjusted as necessary, such as with, for example, hydrochloric acid, to dissolve excess magnesium hydroxide formed from magnesium metal present in the mixture.

If it becomes necessary or desirable to adjust pH, a filtration step should first be conducted to produce a relatively clear solution. Filtration better ensures sequestration and removal of reactive metal fine particles. If, for example, it is attempted to adjust pH downwardly from 9 to 6 by addition of hydrochloric acid prior to filtration, sequestering magnesium hydroxide would dissolve at about pH 8, freeing metal particles from encapsulation by magnesium hydroxide flocculants. This could make subsequent filtration more difficult and may increase combustion hazards.

According to certain non-limiting embodiments, a method for making a brine comprising dissolved magnesium chloride includes restoring the previously-produced brine (i.e., the "heel") to substantially its original state so that it may be re-used to produce additional brine using the method. In at least one embodiment, the brine comprising dissolved magnesium chloride that is made by the method may be discharged or otherwise separated from the mixture to restore (i.e., recycle) the previously-produced brine. In this way, the heel is re-used to produce multiple batches of brine according to the method, advantageously serving as a thermal mass in each such iteration of the method to facilitate controlling the temperature of the mixture during dissolution of batches of anhydrous magnesium chloride-containing solid material.

According to one example of a method according to the present disclosure, a batch of 11,000 gallons of a dissolved magnesium chloride brine is made by first including a 20,000 gallon dissolved magnesium chloride brine heel in a recirculation tank. Just prior to making up the mixture, 10,000 gallons of fresh water is added to the heel in the recirculation tank. 35,500 pounds of solid by-product from the Kroll process production of titanium metal, including principally anhydrous magnesium chloride and a relatively small amount of solid magnesium, is optionally comminuted to a desired particle size and then added to a dissolving tank. The diluted brine heel is circulated to the dissolving tank to dissolve the anhydrous magnesium chloride in the solid material. The mixture is recirculated between the tanks to promote dissolution of the solid material and to control temperature fluctuations. If the solid material is too coarse or is combined with the diluted heel too rapidly, the magnesium chloride in the solid material may partially recrystallize in the bottom of a tank and collect as a large solid mass that is slow to dissolve. Metallic magnesium in the solid material forms magnesium hydroxide in the mixture and separates from solution as a flocculant, trapping metal particles and other insoluble solid matter in the mixture. The large volume of heel relative to the intended new batch volume (about 2:1) helps to restrict the temperature of the mixture to less than the mixture's boiling point as the exothermic dissolution of the anhydrous magnesium chloride proceeds.

When the dissolution has been adjudged to have sufficiently proceeded, 11,000 gallons of brine product is recovered (e.g., by extracting the product through a drain port in a tank of the reactor system), thereby returning the brine heel substantially to its previous state. The brine heel is now ready to receive additional water and solid material to generate a further batch of brine product. In this method, the flow between the tanks may be heat exchanged to help dissipate the heat of dissolution of magnesium chloride. Preferably, the temperatures of the dissolving tank and the recirculation tank are controlled to a maximum of less than 80° C. and less than 60° C., respectively, to facilitate heat exchange between the tanks. Although two tanks are used the reactor system of this example, it is believed that a single tank may be used, but may need to be well agitated to provide a suitable dissolution rate.

Further examples are provided below.

D. EXAMPLES

The various embodiments described herein may be better understood when read in conjunction with the following representative examples, which are provided for purposes of illustration only and not as a limitation on the scope of the present disclosure or the attached claims.

1. Manufacture of a Brine Heel

Twenty gallons of water was added to a large high-density polyethylene barrel-shaped container equipped with a recirculating pump to agitate the contents of the container. During a two-hour period, thirty-six pounds of anhydrous magnesium chloride having a particle size less than 3 Tyler mesh was added to the container. The anhydrous magnesium chloride was formed as the by-product of zirconium production by the Kroll process. During the addition of the anhydrous magnesium chloride, the temperature of the mixture reached a maximum of 73° C. The mixture was recirculated overnight within the container by the pump at a rate of 3.3 gallons per minute, and the temperature of the mixture decreased to 25° C. During a 45 minute period of time, an additional thirty-five pounds of anhydrous magnesium chloride having a particle size less than 3 Tyler mesh was added to the container, and a maximum temperature of 83° C. was reached. The resulting brine heel was allowed to cool to room temperature. The brine heel, which was about 30% by weight $MgCl_2$, was used to produce a brine product in the following Examples 2 and 3.

2. Manufacture of a Brine Product Using Fine Salt Particles

Nine gallons of water was added to the brine heel at room temperature. The container was sparged with air to provide additional agitation to facilitate dissolving. Eighteen pounds of anhydrous magnesium chloride from the same batch used to produce the heel of Example 1 (having a particle size less than 3 Tyler mesh) was added rapidly to the container. After 20 minutes, it was judged to have substantially dissolved, and the temperature had risen from 26° C. to 54° C. A further 13 pounds of the same batch of anhydrous magnesium chloride was added to the container, and after 43 minutes was judged to have substantially dissolved. The temperature reached a maximum of 71° C. The steps of adding the eighteen and thirteen pound portions of chloride established the dissolving time for anhydrous magnesium chloride of this particle size to be approximately 30 minutes. After allowing the brine to cool, ten gallons of the brine was pumped off as a brine product, thereby restoring the heel to substantially its former state.

3. Manufacture of a Brine Product Using Coarse Salt Particles

A coarse anhydrous magnesium chloride was provided by shredding large solid chunks of anhydrous magnesium chloride produced as a by-product of zirconium production by the Kroll process. The shredding process produced a coarse material including pieces having a smallest dimension as large as 5 mm. It was observed that a typical coarse particle produced by the shredding process was about 40 mm in longest dimension and a typical fine particle was about 5 mm in longest dimension. The coarse anhydrous magnesium chloride was substantially larger than the chloride used to form the heel in Example 1 and the brine product in Example 2. To a brine heel produced as set out in Example 1 was added 8.2 gallons of water and, in five increments, 29.2 pounds of the coarse anhydrous magnesium chloride. By estimation, about 20% of the coarse chloride material remained un-dissolved after 34 minutes during the process of adding the increments. Incremental addition proceeded, and it was observed that each of the five increments required about 90 minutes to dissolve. The total dissolving time for the coarse magnesium chloride was about 6 hours, which was substantially longer than the approximate one-hour required to dissolve the relatively fine particles of chloride in Example 2. The highest temperature reached while dissolving the anhydrous magnesium chloride in Example 3 was 38° C. After allowing the mixture to cool, ten gallons of the brine was pumped off as a brine product 4. Testing of the Filter Cake from Filtration of the Brine About 100 gallons of a mixture of the brines formed in Examples 2 and 3 above was pumped through a one micron particle size bag filter. The bag filter was then opened and the filter cake, which was a damp, black material, was subjected to two tests: (i) Ignitability of Solids, EPA Method 1030; and (ii) UN Test N.I, Metals and Metal Powders, Method 33.2.1.4. Both tests showed that the filter cake material does not ignite and propagate, showing that the insoluble material in the brine trapped in the bag filter does not represent an ignition hazard.

All documents cited herein are, in relevant part, incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art.

While particular embodiments have been illustrated and described herein, those skilled in the art will understand that various other changes and modifications can be made without departing from the spirit and scope of the invention. Those skilled in the art will recognize, or be able to ascertain using no more than routine experimentation, numerous equivalents to the specific methods described herein, including alternatives, variants, additions, deletions, modifications and substitutions. This disclosure, including the appended claims, is intended to cover all such equivalents that are within the spirit and scope of this invention.

What is claimed is:

1. A method for making a brine comprising dissolved magnesium chloride, the method comprising:

forming a mixture in the reactor comprising adding to the reactor: a first brine produced from ingredients including solid anhydrous magnesium chloride produced as a by-product of the Kroll process, water, and a solid material produced as a by-product of the Kroll process including solid anhydrous magnesium chloride and solid elemental magnesium to generate flocculant particles and reduce pyrophoric hazards;

dissolving at least a portion of the solid material in the mixture while simultaneously controlling the temperature of the mixture; and filtering at least a portion of insoluble matter from the mixture to form a second brine.

2. The method of claim 1, further comprising, prior to forming the mixture, comminuting the solid material to a desired particle size.

3. The method of claim 1, further comprising, prior to forming the mixture, comminuting the solid material to particles including a largest dimension less than 10 mm.

4. The method of claim further comprising, prior to forming the mixture, comminuting the solid material to particles including a largest dimension less than 5 mm.

5. The method of claim 1, wherein the solid material is a by-product of the production of one of titanium, zirconium, and hafnium by the Kroll process.

6. The method of claim 1, further comprising adding additional solid elemental magnesium to the reactor.

7. The method of claim 1, further comprising adding 0.05% additional solid elemental magnesium to the reactor, wherein the weight percentage is based on the weight of anhydrous magnesium chloride in the solid material.

8. The method of claim 1, further comprising adding additional magnesium hydroxide to the reactor.

9. The method of claim 1, wherein the first brine comprises dissolved magnesium chloride.

10. The method of claim 1, wherein the ratio of the volume of the first brine to the volume of the second brine is from 1:1 to 2:1.

11. The method of claim 1, wherein the ratio of the volume of the first brine to the volume of the second brine is at least 2:1.

12. The method of claim 1, wherein the ratio of the volume of the first brine to the total volume of water in the mixture is 2:1.

13. The method of claim 1, wherein forming the mixture comprises forming the mixture in a single reactor.

14. The method of claim 1, further comprising agitating the mixture.

15. The method of claim 14, wherein agitating the mixture comprises sparging the mixture with a gas.

16. The method of claim 1, further comprising recirculating the mixture.

17. The method of claim 16, wherein recirculating the mixture comprises recirculating the mixture with a recirculating pump.

18. The method of claim 1, wherein forming the mixture comprises forming the mixture in a reactor system comprising a dissolving tank and a recirculation tank.

19. The method of claim 18, further comprising adding the solid material to the dissolving tank and adding the first brine and the water to the recirculation tank.

20. The method of claim 19, further comprising recirculating the mixture from the dissolving tank through the recirculation tank and back to the dissolving tank.

21. The method of claim 20, wherein the temperature of the mixture in the dissolving tank is less than 80° C. and the temperature of the mixture in the recirculating tank is less than 60° C.

22. The method of claim 1, wherein controlling the temperature of the mixture comprises controlling the temperature of the mixture using a heat exchanger.

23. The method of claim 1, wherein controlling the temperature of the mixture comprises controlling the temperature of the mixture to a temperature less than the boiling point of the mixture.

24. The method of claim 1, wherein controlling the temperature of the mixture comprises controlling the temperature of the mixture to a temperature less than 130° C.

25. The method of claim 1, wherein controlling the temperature of the mixture comprises controlling the temperature of the mixture to a temperature less than 90° C.

26. The method of claim 1, wherein controlling the temperature of the mixture comprises controlling the temperature of the mixture to a temperature less than 60° C.

27. The method of claim 1, wherein filtering at least a portion of insoluble matter from the mixture comprises filtering the mixture through a one micron particle size filter.

28. The method of claim 1, wherein filtering at least a portion of insoluble matter from the mixture comprises filtering at least one of titanium, zirconium, hafnium, magnesium and magnesium hydroxide from the mixture.

29. The method of claim 1, further comprising adjusting the pH of the mixture to greater than 6 to 9.

30. The method of claim 1, further comprising separating at least a portion of the brine produced by the method to restore the first brine to its original state.

31. A method for making a brine comprising dissolved magnesium chloride, the method comprising:
comminuting a solid material produced as a by-product of the Kroll process including solid anhydrous magnesium chloride to particles including a largest dimension less than 10 mm;
forming a mixture in a reactor comprising adding to the reactor: the solid material, two parts by volume of a first brine comprising magnesium chloride to the reactor, wherein the volume is based on the volume of the brine produced by the method, water, solid elemental magnesium sufficient to provide 0.05 weight percent of the solid elemental magnesium based on the weight of anhydrous magnesium chloride in the solid material to generate flocculant particles and reduce pyrophoric hazards;
dissolving at least a portion of the solid material in the mixture while simultaneously controlling the temperature of the mixture; and
filtering at least a portion of insoluble matter from the mixture to form a second brine.

32. The method of claim 31, further comprising agitating the mixture.

33. The method of claim 31, wherein controlling the temperature of the mixture comprises controlling the temperature of the mixture to a temperature less than the boiling point of the mixture.

34. The method of claim 31, wherein forming the mixture comprises forming the mixture in a reactor system comprising a dissolving tank and a recirculation tank.

35. The method of claim 31, further comprising recirculating the mixture from the dissolving tank through the recirculation tank and back to the dissolving tank.

36. The method of claim 31, wherein the temperature of the mixture the dissolving tank is less than 80° C. and the temperature of the mixture in the recirculating tank is less than 60° C.

37. The method of claim 31, further comprising adjusting the pH of the mixture to greater than 6 to 9.

38. The method of claim 1, wherein a concentration of the first brine is about the same as a concentration of the second brine.

39. The method of claim 1, wherein the filtered insoluble matter comprises solid elemental zirconium.

40. The method of claim 1, wherein the ere soluble matter is not a pyrophoric hazard.

41. The method of claim 29, wherein, after adjusting the pH of the mixture, the pH of the mixture is not 6.

42. The method of claim 1, further comprising adjusting the pH of the mixture to greater than 6 to 9.

43. A method for making a brine comprising dissolved magnesium chloride, the method comprising:
providing to a reactor a first brine including solid anhydrous magnesium chloride produced as a by-product of the Kroll process;
forming a mixture in the reactor comprising providing to the reactor: water and a solid material produced as a by-product of the Kroll process including solid anhydrous magnesium chloride and solid elemental magnesium to generate flocculant particles and reduce pyrophoric hazards;
dissolving at least a portion of the solid material in the mixture while simultaneously controlling the temperature of the mixture to a temperature less than the boiling point of the mixture when the solid material is provided to the reactor; and
filtering at least a portion of insoluble matter from the mixture to form a second brine.

* * * * *